United States Patent
Bishop et al.

(10) Patent No.: US 6,761,502 B2
(45) Date of Patent: Jul. 13, 2004

(54) JOINT FOR SHEET MATERIAL AND A METHOD OF JOINING SHEET MATERIAL

(75) Inventors: Jeffrey C Bishop, Derby (GB); Michael J Holme, Burton on Trent (GB)

(73) Assignee: Rolls-Royce plc, London (GB)

(*) Notice: Subject to any disclaimer, the term of this patent is extended or adjusted under 35 U.S.C. 154(b) by 0 days.

(21) Appl. No.: 10/228,050

(22) Filed: Aug. 27, 2002

(65) Prior Publication Data

US 2003/0002916 A1 Jan. 2, 2003

Related U.S. Application Data

(63) Continuation of application No. PCT/GB01/00622, filed on Feb. 15, 2001.

(30) Foreign Application Priority Data

Mar. 1, 2000 (GB) .............................................. 0004801

(51) Int. Cl.[7] .............................................. H01R 23/70
(52) U.S. Cl. ....................................................... 403/278
(58) Field of Search ................................ 403/278, 279, 403/274

(56) References Cited

U.S. PATENT DOCUMENTS

| | | | | |
|---|---|---|---|---|
| 3,958,389 A | * | 5/1976 | Whiteside et al. | 403/279 |
| 5,086,997 A | * | 2/1992 | Glass | 403/279 X |
| 5,607,358 A | * | 3/1997 | Stall et al. | 403/279 X |

FOREIGN PATENT DOCUMENTS

| | | |
|---|---|---|
| EP | 632543 A | 1/1995 |
| FR | 2744656 A | 8/1997 |
| GB | 1584403 P | 2/1981 |
| GB | 2150474 A | 7/1985 |
| GB | 2159078 A | 11/1985 |

* cited by examiner

*Primary Examiner*—John R. Cottingham
(74) *Attorney, Agent, or Firm*—W. Warren Taltavull; Manelli Denison & Selter PLLC

(57) ABSTRACT

A joint (40) for joining a first metal sheet (10) to a second metal sheet (30) comprises a plurality of deformable projections (14) on an edge (12) of the first metal sheet (10). Each deformable projection (14) has an aperture (16) therethrough to form two sides (18,20) and a deformable head (22). The sides (18,20) have dogs (24,26). A plurality of slots (32) are provided through the second metal sheet (30). The deformable projections (14) extend through the slots (32) in the second metal sheet (30). The deformable projections (14) are deformed such that the head (22) of the deformable projection (14) expands the dogs (18,20) of the deformable projections (14) beyond the sides (34,36) of the slots (32) to prevent withdrawal of the deformable projections (14) from the slots (32) in the second ductile sheet (30).

23 Claims, 1 Drawing Sheet

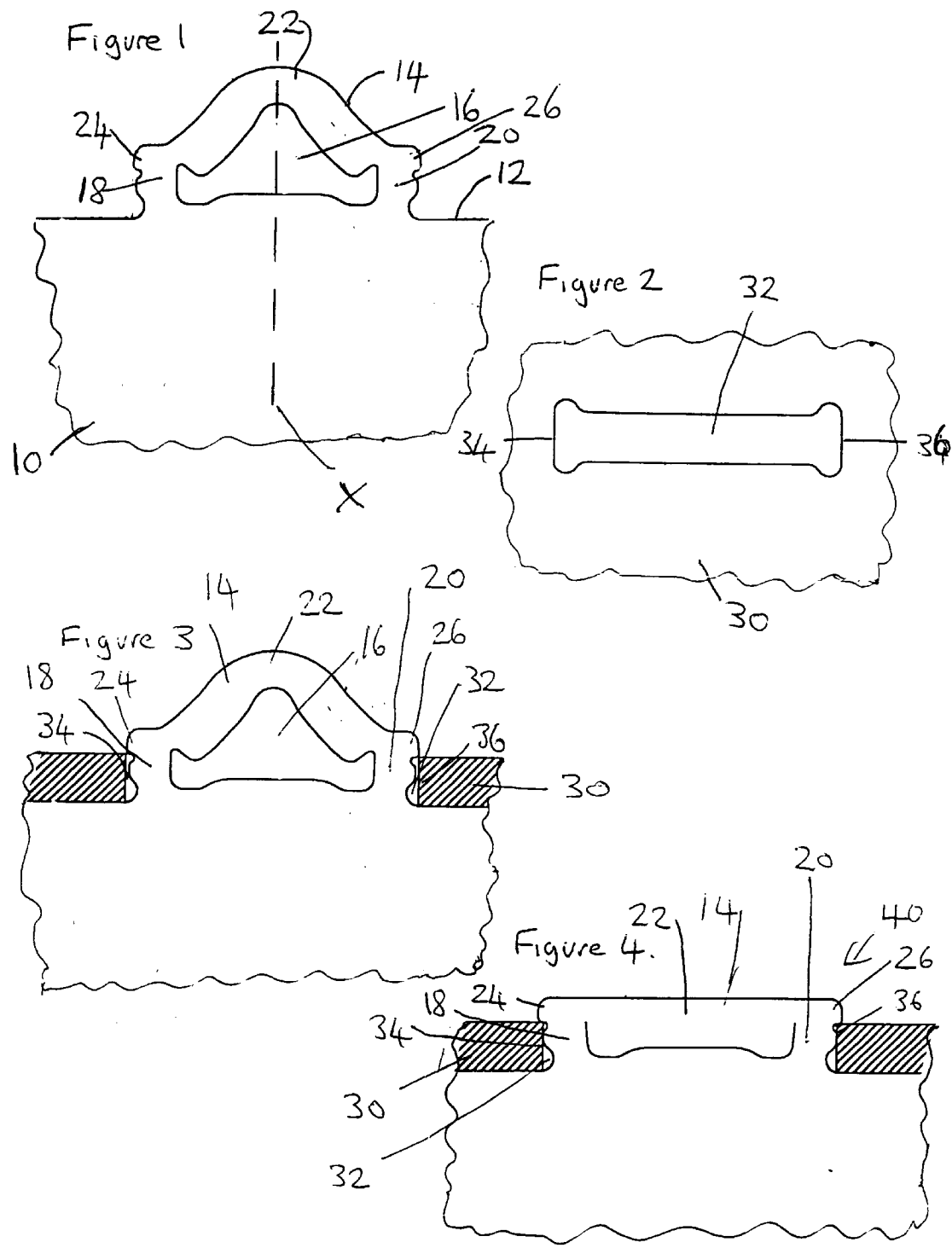

JOINT FOR SHEET MATERIAL AND A METHOD OF JOINING SHEET MATERIAL

This a continuation of International Appl. No. PCT/GB01/00622 filed Feb. 15, 2001.

FIELD OF THE INVENTION

The present invention relates to joints for sheet material and to methods of joining sheet material, and in particular to joints for sheet metal and to methods of joining sheet metal.

BACKGROUND OF THE INVENTION

It is known to join sheet metal components by welding an edge of one sheet metal component to the face of an adjacent sheet metal component, or by firstly bending the end of one sheet metal component and welding the face of the bent over end of the first metal component to the face of an adjacent sheet metal component. It is known that other types of bonding may be used for example brazing, soldering or adhesive.

It is also known to join sheet metal components by firstly bending over the end of one sheet metal component and riveting the face of the bent over end of the first sheet metal component to the face of an adjacent sheet metal component. The rivets are separate fixing devices of circular cross-section inserted through circular cross-section apertures in the metal sheets. It is also known that other types of mechanical attachment may be used for example nuts and bolts.

It is further known to join sheet metal components by firstly providing one or more projections from the edge of one of the sheet metal components, providing a corresponding number of slots through the adjacent sheet metal component and passing the projections on the first metal sheet through the slots in the adjacent sheet metal component. It is known that the projections are then either bent over to abut the opposite face of the adjacent sheet metal component or the projections are twisted to prevent the projection withdrawing from the slot.

A problem with the welded, brazed or soldered joint is that these are hot joining processes which may require subsequent costly heat treatment of the sheet metal components.

A problem with the fold over projection joint or the twist projection joint is that they are not used in joints which are required to transmit or resist external loads. The fold over projection joint, or the twist projection joint, is normally used to simply maintain the relative positions of an assembly of sheet metal components. The fold over projection and twist projection have a tendency to unfold, untwist or deform such that the joint becomes loose.

SUMMARY OF THE INVENTION

The present invention seeks to provide a novel rivet type joint for sheet material.

Accordingly the present invention provides a joint for joining a first ductile sheet to a second ductile sheet comprising at least one deformable projection on an edge of the first ductile sheet, the at least one deformable projection having an aperture therethrough to define two sides, a base and a head of the deformable projection, the base interconnecting the sides of the deformable projection, the head interconnecting the sides of the deformable projection, at least one aperture extending through the second ductile sheet, the at least one deformable projection on the first sheet extending through the at least one aperture in the second sheet, the head of the deformable projection being deformed such that the head expands at least a portion of each side of the deformable projection beyond the sides of the at least one aperture to prevent withdrawal of the deformable projection from the aperture in the second ductile sheet, the base of the deformable projection extends a predetermined distance into the at least one aperture in the second ductile sheet, the deformable projection and the aperture through the deformable projection are shaped and configured such that deformation of the head fills the aperture.

Preferably each side of the deformable projection has a dog extending away from the other dog such that deformation of the head expands the dog of each side of the deformable projection beyond the sides of the aperture to prevent withdrawal of the deformable projection from the aperture in the second ductile sheet.

Preferably the head expands the remainder of each side of the deformable projection into contact with the sides of the aperture.

Preferably the undeformed head tapers away from the edge of the first sheet.

Preferably the aperture is a slot. Preferably the deformable head and the slot are rectangular in cross-section.

Preferably the deformable head and the portion of each side of the deformable projection are arranged such that they are located at, or greater than, a predetermined distance from the edge of the first ductile sheet, the predetermined distance is the thickness of the second ductile sheet.

Preferably the first ductile sheet has a plurality of deformable projections and the second ductile sheet has a plurality of apertures.

The present invention also provides a method of joining a first ductile sheet to a second ductile sheet comprising forming at least one deformable projection on an edge of the first ductile sheet, forming an aperture through the at least one deformable projection to define two sides, a base and a head of the deformable projection, the base interconnecting the sides of the deformable projection, the head interconnecting the sides of the deformable projection, forming at least one aperture extending through the second ductile sheet, inserting the at least one deformable projection on the first sheet extending through the at least one aperture in the second sheet, deforming the head of the at least one deformable projection such that the head expands at least a portion of each side of the deformable projection beyond the sides of the at least one aperture to prevent withdrawal of the deformable projection from the aperture in the second ductile sheet, forming the base of the deformable projection such that it extends a predetermined distance into the at least one aperture in the second ductile sheet, forming the deformable projection and the aperture through the deformable projection such that they are shaped and configured so that deformation of the head fills the aperture.

Preferably the method comprises forming a dog on each side of the deformable projection, each dog extending away from the other dog such that deformation of the head expands the dog of each side of the deformable projection beyond the sides of the aperture to prevent withdrawal of the deformable projection from the aperture in the second ductile sheet.

Preferably the method comprises forming the undeformed head such that it tapers away from the edge of the first sheet.

Preferably the method comprises forming a slot in the second ductile sheet.

Preferably the method comprises forming the deformable head and the slot such that they are rectangular in cross-section.

Preferably the method comprises forming the deformable head and the portion of each side of the deformable projection such that they are located at, or greater than, a predetermined distance from the edge of the first ductile sheet, the predetermined distance is the thickness of the second ductile sheet.

Preferably the method comprises forming a plurality of deformable projections on the first ductile sheet and a plurality of apertures in the second ductile sheet.

Preferably the method comprises forming the at least one deformable projection on the first ductile sheet by laser cutting.

Preferably the method comprises forming the at least one aperture in the second sheet by laser cutting.

BRIEF DESCRIPTION OF THE DRAWING

The present invention will be more fully described by way of example with reference to the accompanying drawings in which:

FIG. 1 is a plan view of a portion of first sheet metal component for forming a joint between two sheet metal components.

FIG. 2 is a plan view of a portion of a second sheet metal component for forming a joint between two sheet metal components.

FIG. 3 is a plan view part way through the assembly of a joint between two sheet metal components shown in FIGS. 1 and 2 according to the present invention.

FIG. 4 is a plan view of a of a completed joint between the two sheet metal components shown in FIGS. 1 and 2 according to the present invention.

DETAILED DESCRIPTION OF THE INVENTION

A first metal sheet 10, as shown in FIG. 1, has an edge 12 and one or more integral deformable projections 14 extend from the edge 12 of the first metal sheet 10. The integral deformable projections 14 are spaced at suitable distances along the edge 12 of the first metal sheet 10.

Each deformable projection 14 has an aperture 16 therethrough to define two sides 18 and 20 and a head 22 which is remote from the edge of the first sheet 10. The head 22 interconnects the sides 18 and 20 of the deformable projection 14. Each side 18 and 20 of the deformable projection 14 has a corresponding dog 24 and 26, which extends away from the other dog 26 and 24 respectively. The head 22 tapers to its centre away from the edge 12 of the first metal sheet 10. The deformable projections 14 are symmetric around the line X.

The deformable projections 14 and the apertures 16 are formed on the first metal sheet 10 by laser cutting the first metal sheet 10 in the shape as shown in FIG. 1. The laser cutting process is able to create narrow cuts, about 0.15 mm wide, perpendicular to the surface of the first metal sheet 10 leaving a milled edge finish. The laser cutting allows narrow and accurately positioned cuts in the first sheet metal 10.

A second metal sheet 30, as shown in FIG. 2, has one or more slots 32 extending through the second metal sheet 30. The slots 32 are spaced at suitable distances along the second metal sheet 30, equivalent to the distances between adjacent deformable projections 14 on the first metal sheet 10.

Each slot 32 is substantially the same length, although slightly longer, than the length of the deformable projections 14 along the edge 12 of the first metal sheet 10 in order to receive the respective deformable projection 14 on the first metal sheet 10. Each slot 32 has longitudinally spaced sides 34 and 36 respectively. The slots 32 are preferably rectangular in cross-section although other suitable shapes may be used, for example "dog bone" cross-sections shapes.

The slots 32 are formed on the second metal sheet 30 by laser cutting the second metal sheet 30 in the shape as shown in FIG. 2. The laser cutting process is able to create narrow cuts, about 0.15 mm wide, perpendicular to the surface of the second metal sheet 30 leaving a milled edge finish. The laser cutting allows narrow and accurately positioned cuts in the second sheet metal 30.

The deformable head 22 and the dogs 24 and 26 on the sides 18 and 20 respectively of the deformable projection 14 are arranged such that they are located at, or greater than, a predetermined distance from the edge 12 of the first ductile sheet 10. The predetermined distance is the thickness of the second ductile sheet 30.

A joint 40 is formed between the first metal sheet 10 and the second metal sheet 30, as shown more clearly in FIGS. 3 and 4, by firstly aligning each deformable projection 14 on the first metal sheet 10 with the corresponding one of the slots 32 on the second metal sheet 30.

Each deformable projection 14 is then inserted into the corresponding one of the slots 32, as shown more clearly in FIG. 3. The alignment and insertion of the deformable projections 14 into the slots 32 is aided by the tapered head 22. In the fully inserted position the dogs 24 and 26 and the deformable head protrude beyond the slot 32 in the second metal sheet 30.

The first and second metal sheets 10 and 30 may be temporarily joined together by placing dowels, or pegs etc., through the apertures 16 in the deformable projections 14.

The first and second metal sheets 10 and 30 are permanently joined together by deforming the each of the deformable projections 14, this may by hitting with a hammer etc., to form a joint 40 as shown in FIG. 4. The deformable head 22 of the deformable projection 14 is pushed towards the edge 12 of the first metal sheet 10. This causes the deformable head 22 to push the dogs 24 and 26, and surrounding portions of the sides 18 and 20 respectively, away from each other such that the dogs 24 and 26 project beyond the sides 34 and 36 respectively of the slots 32 to prevent the withdrawal of the deformable projection 14 from the slot 32 in the second ductile sheet 30. Thus the dogs 24 and 26 are caused to expand. The deformable head 22 also causes the sides 16 and 18 to expand to abut the sides 34 and 36 respectively of the slots 30.

The projection of the dogs 24 and 26 beyond the sides 34 and 36 of the slots 32 provides the principal retention feature of the joint 40. The frictional contact between the sides 18 and 20 of the deformable projection 14 and the sides 34 and 36 respectively of the slot 32 provides the secondary retention feature of the joint 40.

The deformed head 22 is substantially parallel with the edge 12 of the first metal sheet 10 and acts as a direct, compression, strut between the dogs 24 and 26 to restrain, preferably prevent, unfastening of the joint 40.

The deformable projection 14 and the aperture 16 through the deformable projection 14 are shaped and configured such that deformation of the deformable head 22 causes the deformable head 22 to fill the aperture 16 and such that the deformed head 22 of the deformed projection 14 is substantially parallel with the edge 12 of the first metal sheet 10.

The joint 40 provides accurate two-dimensional location in the plane of the slots 32 in the second metal sheet 30 within about 0.05 mm of true position.

The joint is scaleable for most metal sheet thicknesses.

The joint 40 may be supplemented by the use of local welding in the region of each joint 40 or continuous welding along a line of joints 40. The deformable head 22 acts as a weld filler for a subsequent welding operation.

The joint comprises one or more integral deformable projections on the edge of a first metal sheet and one or more apertures through a second metal sheet. The integral deformable projections are effectively integral rivets on the edge of the first metal sheet.

The joint enables a set of sheet metal parts to be put into juxtaposition ready for fabrication and jig-sawed together without the use of further jigs, fixtures or other form of expensive apparatus prior to welding etc. In other words a component may be its own assembly jig.

The joint is inexpensive to produce using CNC, computer numerically controlled, laser cutting, although other suitable processes maybe used if they produce similar surface finish of the cuts and width of the cuts.

The sheet metal may be a metal, an alloy or an intermetallic alloy. The metals may be stainless steel sheets, nickel alloy sheets or nickel based superalloy sheets.

Although the invention has been described with reference to metal sheets it may be applied to other ductile sheet material.

The joints may be used in many different industries for example motor vehicles, aeroplanes, gas turbine engines, ships, railway carriages, railway locomotives, light industry etc. In particular the joints may be used to manufacture gas turbine engine nacelles, casings, thrust reverser cascades, honeycomb or box type structures from metal sheets.

What is claimed is:

1. A joint for joining a first ductile to a second ductile sheet comprising at least one deformable projection on an edge of the first ductile sheet, at least one aperture extending through the second ductile sheet, the at least one deformable projection on the first sheet extending through the at least one aperture in the second sheet, the deformable projection being deformed to prevent withdrawal of the deformable projection from the aperture in the second ductile sheet, the at least one deformable projection having an aperture therethrough to define two sides, a base and a head of the deformable projection, the base interconnecting the sides of the deformable projection, the head interconnecting the sides of the deformable projection, the head of the deformable projection being deformed such that the head expands at least a portion of each side of the deformable projection beyond the sides of the at least one aperture, characterized in that the base of the deformable projection extends a predetermined distance into the at least one aperture in the second ductile sheet, the deformable projection and the aperture through the deformable projection being shaped and configured such that deformation of the head fills the aperture in the deformable projection.

2. A joint as claimed in claim 1 wherein each side of the deformable projection has a dog extending away from the other dog such that deformation of the head expands the dog of each side of the deformable projection beyond the sides of the aperture to prevent withdrawal of the deformable projection from the aperture in the second ductile sheet.

3. A joint as claimed in claim 1 wherein the head expands the remainder of each side of the deformable projection into contact with the sides of the aperture.

4. A joint as claimed in claim 2 wherein the head expands the remainder of each side of the deformable projection into contact with the sides of the aperture.

5. A joint as claimed in claim 3 wherein the undeformed head tapers away from the edge of the first ductile sheet.

6. A joint as claimed in claim 4 wherein the aperture in the second ductile sheet is a slot.

7. A joint as claimed in claim 5 wherein the deformable head and the slot are rectangular in cross-section.

8. A joint as claimed in claim 1 wherein the deformable head and the portion of each side the of the deformable projection are arranged such that they are located at, or greater than, a predetermined distance from the edge of the first ductile sheet, the predetermined distance being the thickness of the second ductile sheet.

9. A joint as claimed in claim 7 wherein the first ductile sheet has a plurality of deformable projections and the second ductile sheet has a plurality of apertures.

10. A joint as claimed in claim 1 wherein the first ductile sheet has a plurality of deformable projections and the second ductile sheet has a plurality of apertures.

11. A joint as claimed in claim 9 the ductile sheets are metallic sheets.

12. A joint as claimed in claim 11 wherein the metallic sheets are stainless steel sheets or nickel alloy sheets.

13. A method of joining a first ductile sheet to a second ductile sheet comprising forming at least one deformable projection on an edge of the first ductile sheet, forming at least one aperture extending through the second ductile sheet, inserting the at least one deformable projection on the first ductile sheet through the at least one aperture in the second ductile sheet, deforming the at least one deformable projection to prevent withdrawal the of the deformable projection from the aperture in the second ductile sheet, forming an aperture through the at least one deformable projection to define two sides, a base and a head of the deformable projection, the base interconnecting the sides of the deformable projection, the head interconnecting the sides of the deformable projection, deforming the head of the at least one deformable projection such that the head expands at least a portion of each side of the deformable projection beyond the sides of the at least one aperture, characterized by forming the base of the deformable projection such that it extends a predetermined distance into the at least one aperture in the second ductile sheet, forming the deformable projection and the aperture through the deformable projection such that they are shaped and configured so that deformation of the head fills the aperture in the deformable projection.

14. A method as claimed in claim 13 comprising performing a dog on each side of the deformable projection, each dog extending away from the other doll of the such that deformation of the head expands the dog of each side of the deformable projection beyond the sides of the aperture to prevent withdrawal of the deformable projection from the aperture in the second ductile sheet.

15. A method as claimed in claim 14 comprising forming the undeformed head such that it tapers away from the edge of the first ductile sheet.

16. A method as claimed in claim 13 comprising forming a slot in the second ductile sheet.

17. A method as claimed in claim 16, comprising forming the deformable head and the slot such that they are rectangular in cross-section.

18. A method as claimed in claim 17, the comprising forming the deformable head and the portion of each side of the deformable projection such that they are located at, or greater than, a predetermined distance from the age of the first ductile sheet, the predetermined distance being the thickness of the second ductile sheet.

19. A method as claimed in claim 18 comprising forming a plurality of deformable projections on the first ductile sheet and a plurality of apertures in the second ductile sheet.

20. A method as claimed in claim 19 comprising forming the at least one deformable projection on the first ductile sheet by laser cutting.

21. A method as claimed in claim 20 comprising forming the at least one aperture in the second ductile sheet by laser cutting.

22. A method as claimed in claim 21 wherein the ductile sheets are metallic sheets.

23. A method as claimed in claim 20 wherein the metallic sheets are stainless steel sheets or nickel alloy sheets.

* * * * *